US010151204B2

United States Patent
Houston et al.

(10) Patent No.: US 10,151,204 B2
(45) Date of Patent: Dec. 11, 2018

(54) AIRFOIL INCLUDING LOOSE DAMPER

(71) Applicant: United Technologies Corporation, Hartford, CT (US)

(72) Inventors: David P. Houston, Glastonbury, CT (US); Tracy A. Propheter-Hinckley, Manchester, CT (US); Benjamin T. Fisk, East Granby, CT (US); Anita L. Tracy, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 252 days.

(21) Appl. No.: 15/042,840

(22) Filed: Feb. 12, 2016

(65) Prior Publication Data

US 2016/0160651 A1    Jun. 9, 2016

Related U.S. Application Data

(63) Continuation of application No. 13/454,488, filed on Apr. 24, 2012, now Pat. No. 9,267,380.

(51) Int. Cl.
*F01D 5/16*    (2006.01)
*B22F 3/105*    (2006.01)
(Continued)

(52) U.S. Cl.
CPC .............. *F01D 5/16* (2013.01); *B22F 3/1055* (2013.01); *B22F 5/04* (2013.01); *F01D 9/041* (2013.01);
(Continued)

(58) Field of Classification Search
CPC ... F01D 5/16; F01D 5/26; F01D 9/041; F01D 25/04; F04D 29/38; F04D 29/542; F04D 29/668; B22F 3/1055; B22F 5/04
See application file for complete search history.

(56) References Cited

U.S. PATENT DOCUMENTS 1,833,751 A    11/1931    Kimball
2,343,918 A    3/1944    McCoy
(Continued)

FOREIGN PATENT DOCUMENTS

GB    561897    6/1944
WO    2011019412 A2    2/2011

OTHER PUBLICATIONS

International Preliminary Report on Patentability for International Application No. PCT/US2013/037501 dated Nov. 6, 2014.
(Continued)

*Primary Examiner* — Craig Kim
(74) *Attorney, Agent, or Firm* — Carlson, Gaskey & Olds, P.C.

(57) ABSTRACT

An airfoil includes an airfoil body that has a leading edge and a trailing edge and a first sidewall and a second sidewall that is spaced apart from the first sidewall. The first sidewall and the second sidewall join the leading edge and the trailing edge between a radially outer end and a radially inner end. The first sidewall and the second sidewall at least partially define a cavity extending radially in the airfoil body. A damper member has a free radially inner end in the cavity and a free radially outer end in the cavity. The damper member is free-floating in the cavity.

21 Claims, 6 Drawing Sheets

(51) Int. Cl.
  *B22F 5/04*    (2006.01)
  *F01D 9/04*    (2006.01)
  *F01D 25/04*   (2006.01)
  *F04D 29/38*   (2006.01)
  *F04D 29/54*   (2006.01)
  *F04D 29/66*   (2006.01)
  *B22F 5/10*    (2006.01)

(52) U.S. Cl.
  CPC ............ *F01D 25/04* (2013.01); *F04D 29/38* (2013.01); *F04D 29/542* (2013.01); *F04D 29/668* (2013.01); *B22F 5/10* (2013.01); *F05D 2220/32* (2013.01); *F05D 2230/21* (2013.01); *F05D 2240/50* (2013.01); *F05D 2250/232* (2013.01); *Y02P 10/295* (2015.11)

(56) References Cited

U.S. PATENT DOCUMENTS

| | | |
|---|---|---|
| 4,815,939 A | 3/1989 | Doble |
| 5,038,014 A | 8/1991 | Pratt et al. |
| 5,165,860 A | 11/1992 | Stoner et al. |
| 5,232,344 A * | 8/1993 | El-Aini .............. F01D 5/16 416/145 |
| 5,837,960 A | 11/1998 | Lewis et al. |
| 6,193,465 B1 | 2/2001 | Liotta et al. |
| 6,283,707 B1 | 9/2001 | Chin |
| 6,391,251 B1 | 5/2002 | Keicher et al. |
| 6,669,447 B2 | 12/2003 | Norris et al. |
| 7,029,232 B2 | 4/2006 | Tuffs et al. |
| 7,112,044 B2 | 9/2006 | Whitehead et al. |
| 7,121,800 B2 | 10/2006 | Beattie |
| 7,121,801 B2 | 10/2006 | Surace et al. |
| 7,217,093 B2 | 5/2007 | Propheter et al. |
| 7,270,517 B2 | 9/2007 | Garner |
| 7,857,588 B2 | 12/2010 | Propheter-Hinckley et al. |
| 2005/0169754 A1 | 8/2005 | Surace et al. |
| 2008/0290215 A1 | 11/2008 | Udall et al. |
| 2009/0258168 A1 | 10/2009 | Barcock et al. |
| 2009/0304497 A1 | 12/2009 | Meier et al. |
| 2011/0038734 A1 | 2/2011 | Marra |
| 2011/0048664 A1 | 3/2011 | Kush et al. |

OTHER PUBLICATIONS

European Search Report for European Application No. 13782220.1 completed Apr. 2, 2015.

* cited by examiner

AIRFOIL INCLUDING LOOSE DAMPER

CROSS-REFERENCE TO RELATED APPLICATION

This application is a continuation of U.S. patent application Ser. No. 13/454,488, filed Apr. 24, 2012.

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures within the airfoil. The die casting technique inherently limits the geometry, size, wall thickness and location of airfoil structures. Thus, the design of a traditional airfoil is limited to structures that can be manufactured using the die casting technique, which in turn may limit the performance of the airfoil.

SUMMARY

An airfoil according to an example of the present disclosure includes an airfoil body that has a leading edge and a trailing edge and a first sidewall and a second sidewall that is spaced apart from the first sidewall. The first sidewall and the second sidewall join the leading edge and the trailing edge between a radially outer end and a radially inner end. The first sidewall and the second sidewall at least partially define a cavity extending radially in the airfoil body. A damper member has a free radially inner end in the cavity and a free radially outer end in the cavity. The damper member is free-floating in the cavity.

In a further embodiment of any of the foregoing embodiments, the damper member is elongated in a radial direction between the radially outer end and the radially inner end.

In a further embodiment of any of the foregoing embodiments, the airfoil body further includes at least one fixed guide member that has a bearing surface that circumscribes the damper member.

In a further embodiment of any of the foregoing embodiments, the airfoil body further includes at least one guide member that has a sloped bearing surface with regard to a radial direction between the radially outer end and the radially inner end.

In a further embodiment of any of the foregoing embodiments, the airfoil body further includes a support arm fixed to at least one of the first sidewall or the second sidewall and a radially elongated guide member supported on the support arm. The radially elongated guide member includes a bearing surface with respect to the damper member.

In a further embodiment of any of the foregoing embodiments, the airfoil body includes a plurality of guide members with respective bearing surfaces that are radially spaced apart with regard to a radial direction between the radially outer end and the radially inner end.

In a further embodiment of any of the foregoing embodiments, the damper member includes radially alternating bearing sections and non-bearing sections with regard to a radial direction between the radially outer end and the radially inner end.

A turbine engine according to an example of the present disclosure includes at least one of a fan, a compressor section, or a turbine section that includes an airfoil as in any of the foregoing embodiments.

In a further embodiment of any of the foregoing embodiments, the damper member is tapered.

In a further embodiment of any of the foregoing embodiments, the damper member is elongated in a radial direction between the radially outer end and the radially inner end.

In a further embodiment of any of the foregoing embodiments, the airfoil body further includes at least one fixed guide member that has a bearing surface that circumscribes the damper member.

In a further embodiment of any of the foregoing embodiments, the airfoil body further includes at least one guide member that has a sloped bearing surface with regard to a radial direction between the radially outer end and the radially inner end.

In a further embodiment of any of the foregoing embodiments, the airfoil body further includes a support arm fixed to at least one of the first sidewall or the second sidewall and a radially elongated guide member supported on the support arm. The radially elongated guide member includes a bearing surface with respect to the damper member.

In a further embodiment of any of the foregoing embodiments, the airfoil body includes a plurality of guide members with respective bearing surfaces that are radially spaced apart with regard to a radial direction between the radially outer end and the radially inner end.

In a further embodiment of any of the foregoing embodiments, the damper member includes radially alternating bearing sections and non-bearing sections with regard to a radial direction between the radially outer end and the radially inner end.

An airfoil according to an example of the present disclosure includes an airfoil body that has an inner end and an outer end that define a radial direction there between. The airfoil body includes a radially elongated internal cavity. A radially elongated damper member has a free first damper end in the cavity and a free second damper end in the cavity. There is a guide member in the cavity, and the guide member includes a continuous bearing surface that is situated with respect to the damper member such that the bearing surface limits movement of the damper member in the radial direction and in a cross direction that is transverse to the radial direction.

In a further embodiment of any of the foregoing embodiments, the continuous bearing surface circumscribes the damper member.

In a further embodiment of any of the foregoing embodiments, the continuous bearing surface has a geometry of a frustrum.

In a further embodiment of any of the foregoing embodiments, the radial direction is a radial outward direction, and the continuous bearing surface is non-limiting with respect to movement of the damper member in a radial inward direction.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
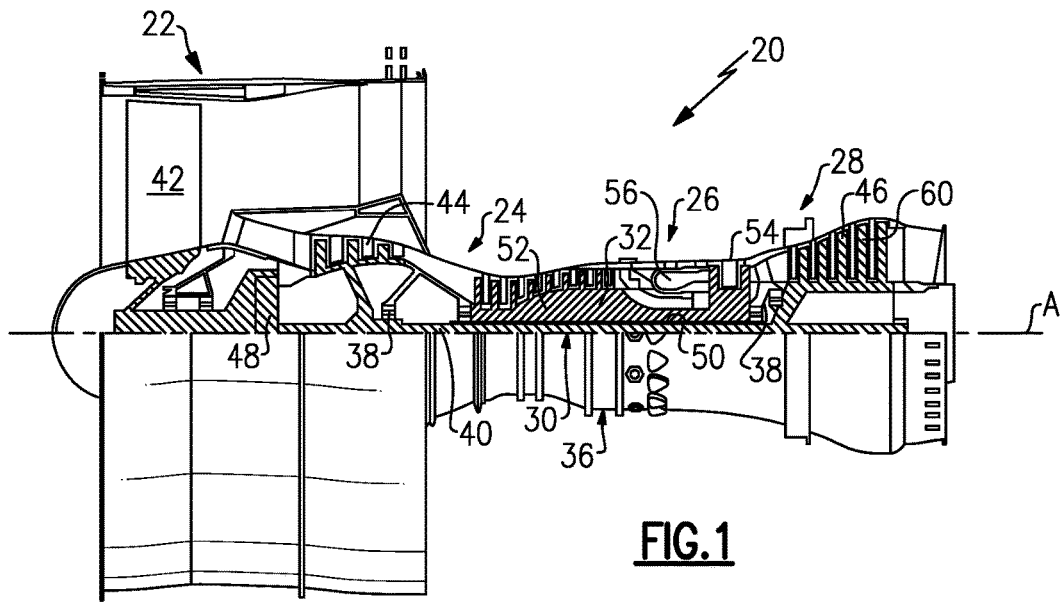
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
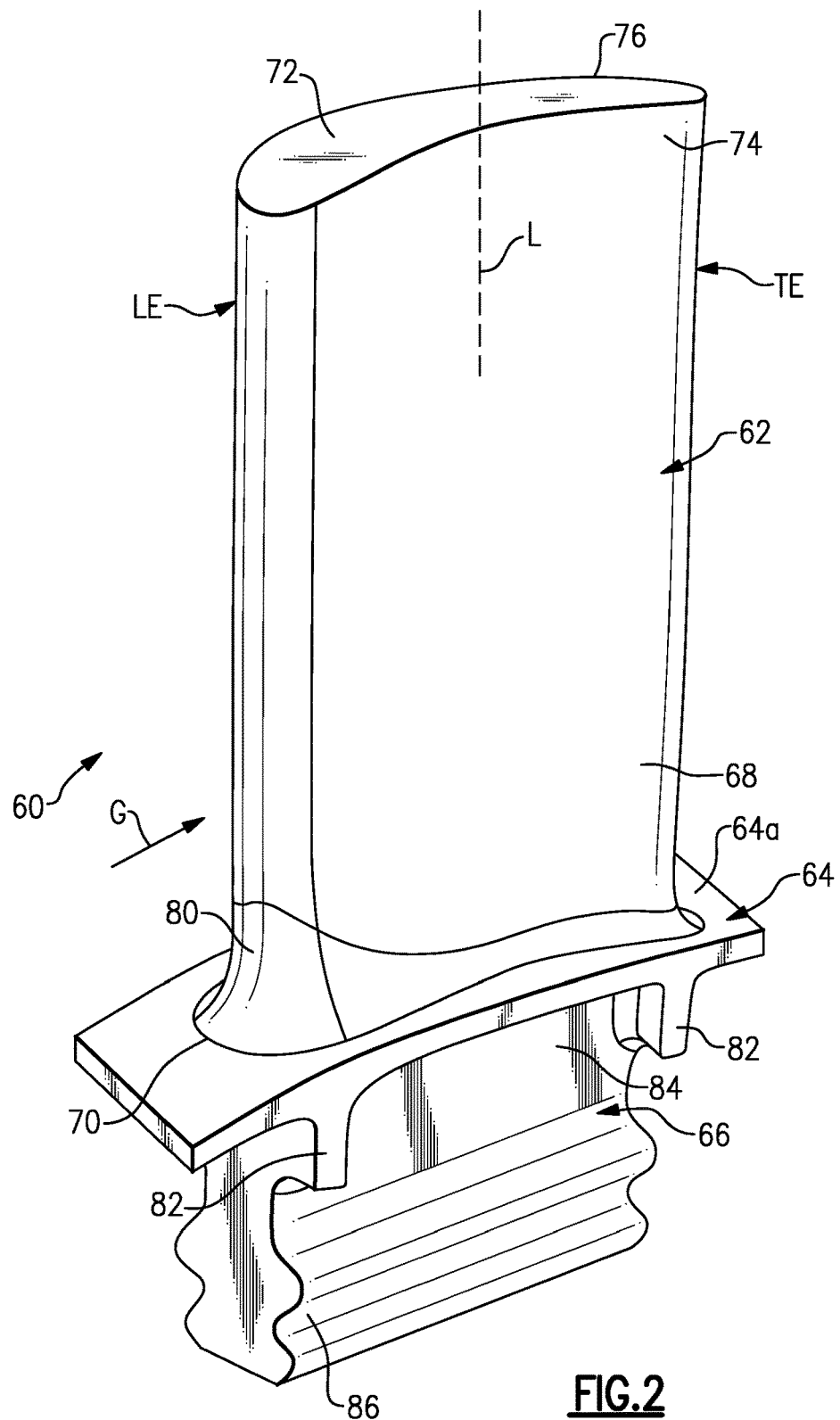
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first sidewall 74 and a second sidewall 76 that is spaced apart from the first sidewall 74. The first sidewall 74 and the second sidewall 76 join the leading edge (LE) and the trailing edge (TE) and at least partially define a cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
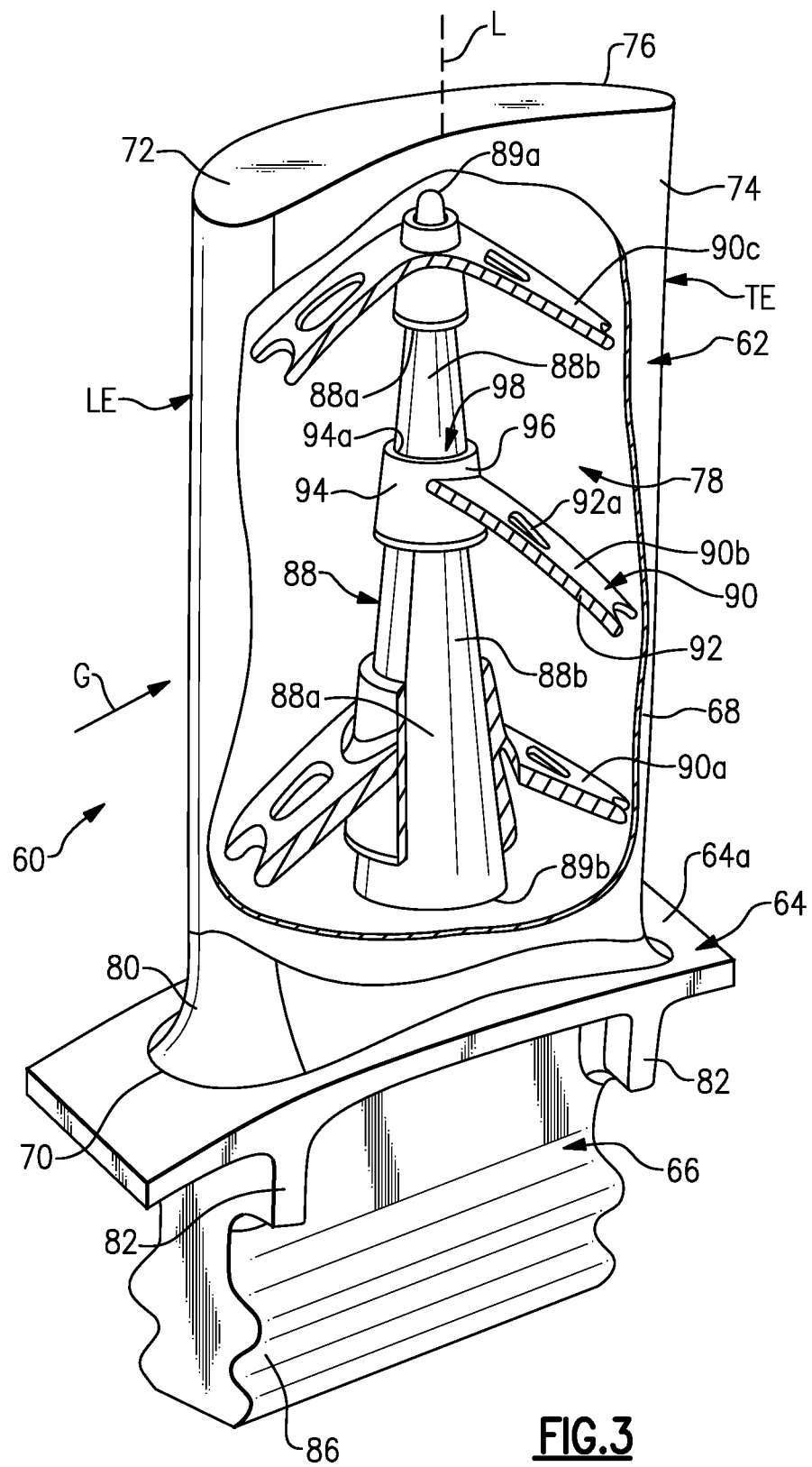
FIG. 3 shows the airfoil of FIG. 2 with a portion cutaway to reveal an interior cavity and damper member.

FIG. 3 shows the airfoil 60 with a portion of the first sidewall 74 cutaway to reveal the cavity 78 within the airfoil body 68. The airfoil 60 in this example is an uncooled structure and the cavity 78 is thus completely sealed from the exterior of the airfoil 60. The airfoil 60 includes a damper member 88 enclosed in the cavity 78. The damper member 88 is loose within the cavity 78 such that the damper member 88 is permitted to move at least longitudinally within the cavity 78. The term "loose" as used in this disclosure refer to the damper member 88 being free-floating, free of any rigid connections to any other structures, although neighboring structures may limit movement of the damper member 88.

In this example, the damper member 88 is longitudinally elongated and tapers from the base 70 toward the tip end 72 of the airfoil portion 62. As an example, the damper member 88 has a geometric shape and in this example is generally conical. It is to be understood, however, that the damper member 88 can have other geometric shapes or even non-basic geometric shapes.

The damper member 88 extends between a first terminal end 89a and a second terminal end 89b. The terminal ends 89a and 89b are free of any connection, rigid or otherwise, to the airfoil body 68. Thus, the damper member 88 is loose and free-floating within the cavity 78.

The airfoil body 68 includes at least one guide member 90 that is fixed with regard to the first sidewall 74 and the second sidewall 76. In the illustrated example, the airfoil body 68 includes three such guide members 90a, 90b and 90c. It is to be understood, however, that the airfoil body 68 may alternatively include only a single guide member 90 or may include more than three guide members 90.

Each of the guide members 90 includes a support arm 92 that is fixed to at least one of the first sidewalls 74 or the second sidewall 76. In the illustrated example, the support arm 92 is inclined with regard to the longitudinal axis L, to distribute load. Alternatively, the inclination of the support arm 92 could be inverted.

Each of the guide members 90 includes a guide piece 94 supported on the respective support arm or arms 92. The guide piece 94 circumscribes the damper member 88 and includes an inner bearing surface 94a which, under certain circumstances that will be described below, contacts the damper member 88. In this example, the bearing surface 94a is frustoconical to provide an area contact with the conical shape of the damper member 88. In that regard, the damper member 88 includes longitudinally alternating bearing sections 88a (bounded by dashed lines) and non-bearing sections 88b. The bearing sections 88a are sections of the damper member 88 that contact, or are able to contact, the bearing surfaces 94a of the guide members 90, while the non-bearing sections 88b do not contact, and are not able to contact, the bearing surfaces 94a of the guide members 90. That is, the damper member 88 has limited movement within the cavity 78.

Figure 4:
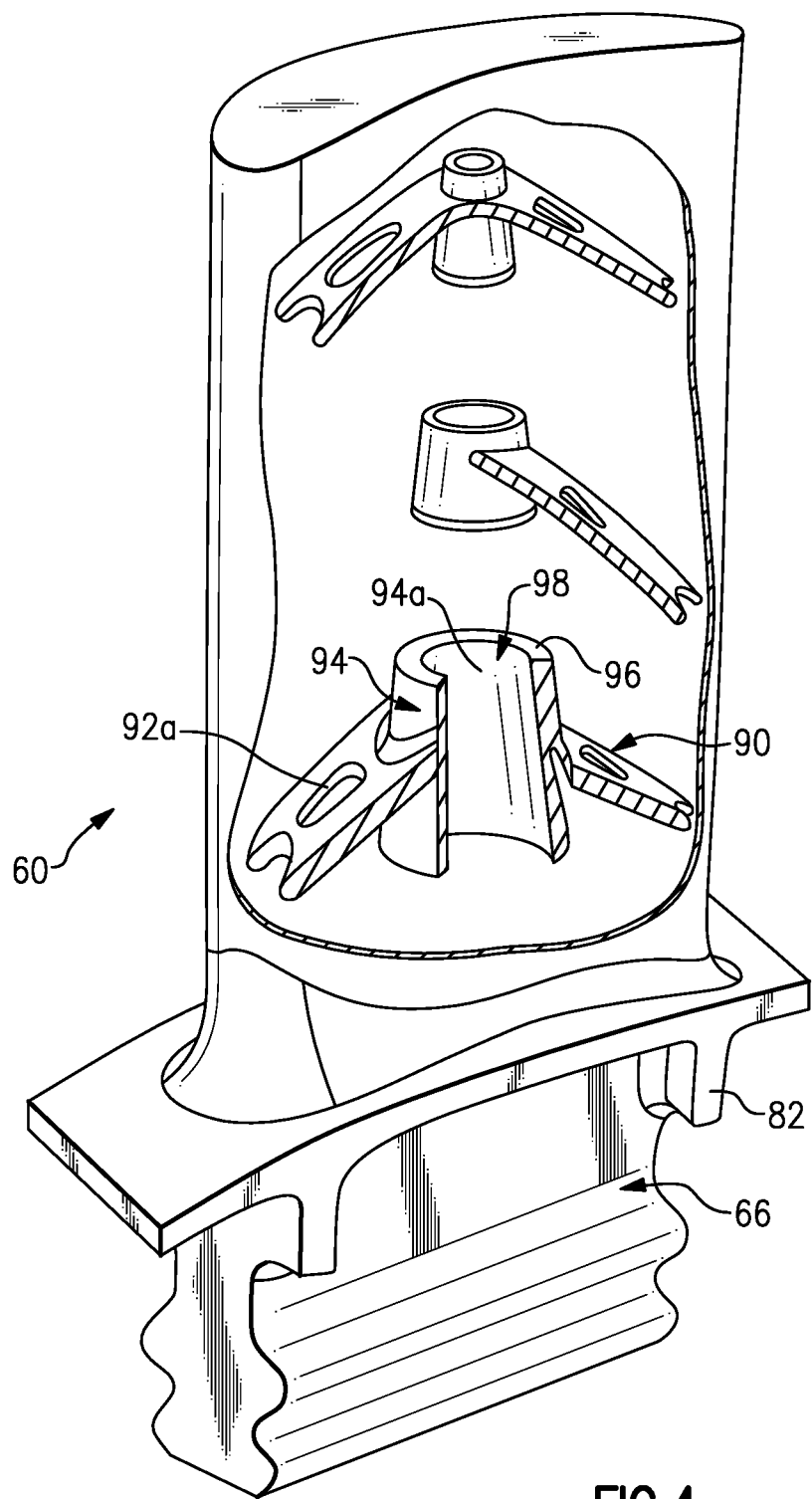
FIG. 4 shows the airfoil of FIG. 3 without the damper member.
Figure 5:
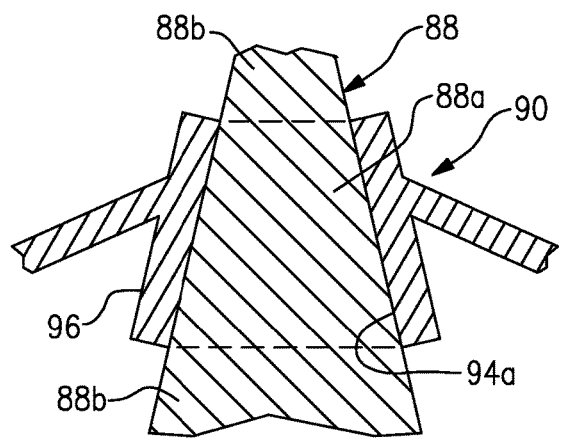
FIG. 5 shows a cross-section of a damper member and a guide member.

FIG. 4 illustrates a view of the airfoil 60 without the damper member 88 such that the guide members 90 can be more clearly seen and FIG. 5 shows a cross-section through a portion of the damper member 88 and guide piece 94 of guide member 90.

The guide piece 94 includes a guide wall 96 that defines at least one opening 98 through which the damper member 88 extends. The guide wall 96 includes the bearing surface 94a. The three guide members 90a, 90b and 90c are longitudinally spaced apart from each other within the cavity 78. Optionally, each of the support arms 92 includes an opening 92a there through (see also FIG. 3) for weight-reduction of the airfoil 60.

When the airfoil 60 is in a static state, such as when the engine 20 in not in operation or the turbine section 28 is not rotating, the loose damper member 88 may sit on the bottom of the cavity 78. Upon rotation of the airfoil 60 about engine central axis A, the damper member 88 is thrown longitudinally outwardly toward the tip end 72 of the airfoil 60. The damper member 88 wedges against the bearing surfaces 94a of the guide pieces 94. The friction between the damper member 88 and the bearing surfaces 94a removes energy from the system and thus serves to dampen vibrations of the airfoil 60.

As can be appreciated, the size and location of the damper member 88, size of the bearing surfaces 94a, number and size of guide members 90 and the location of attachments of the guide members 90 to the sidewalls 74/76 can be tailored to adjust the dampening effect. As an example, the contact area between the damper member 88 and the bearing surfaces 94 influences the amount of energy absorbed, and thus the dampening effect, at a particular location and can be tailored at a design stage by changing this contact area. A greater overall contact area provides a greater amount of energy absorbance and a lower overall contact area provides a relatively lesser amount of absorbance.

Figure 6:
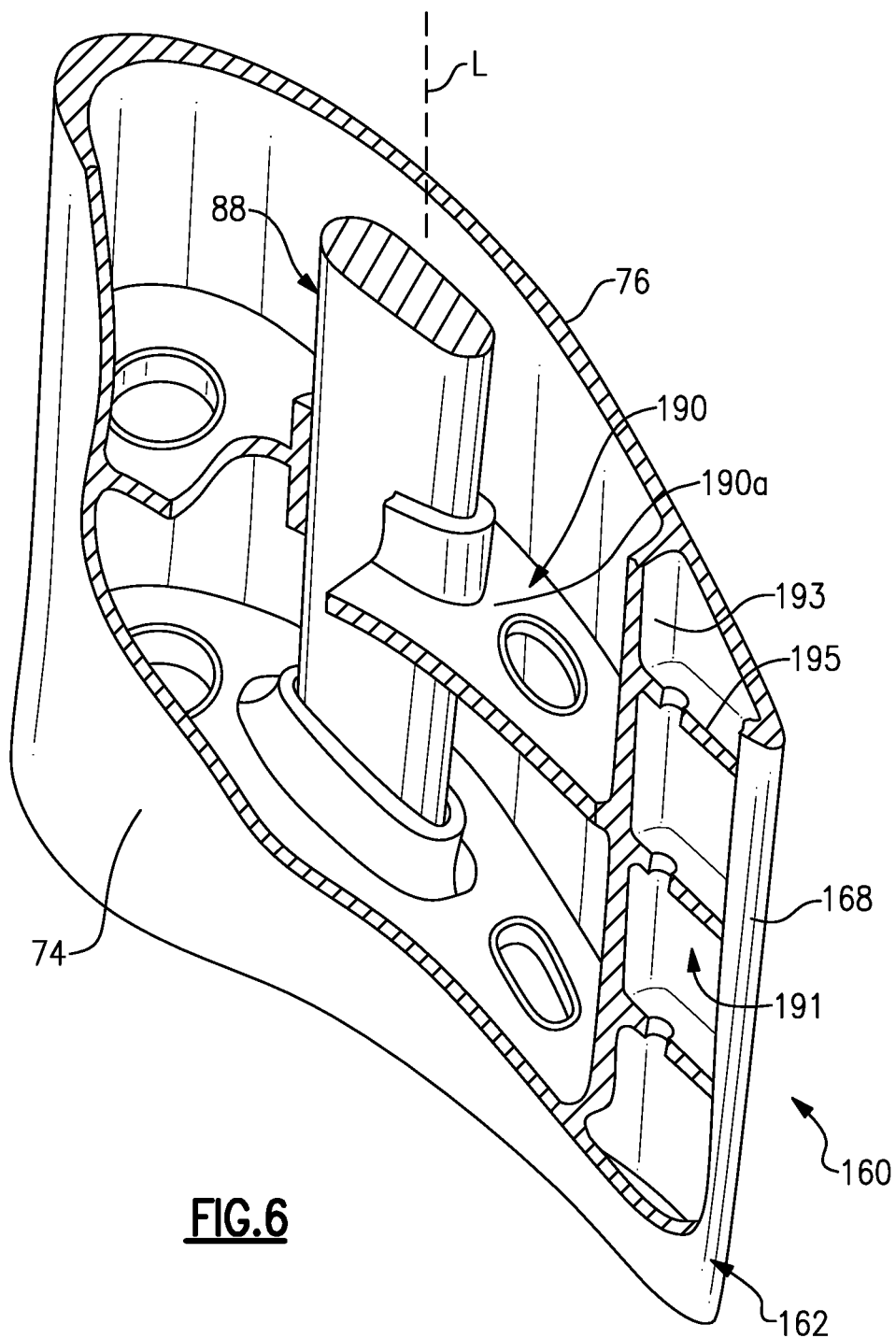
FIG. 6 shows a portion of a modified airfoil having a wing strut.

FIG. 6 shows a portion of a modified airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 additionally includes a wing strut structure 191, which is connected to the guide member 190.

The wing strut structure 191 in this example includes a longitudinally extending rib 193 connected with the first sidewall 74 and the second sidewall 76, and lateral ribs 195 that extend laterally with respect to the longitudinal axis L and connect the first sidewall 74, the second sidewall 76 and the longitudinally extending rib 193. The wing strut structure 191 reinforces the sidewalls 74 and 76, as well as the guide member 190.

Figure 7A:
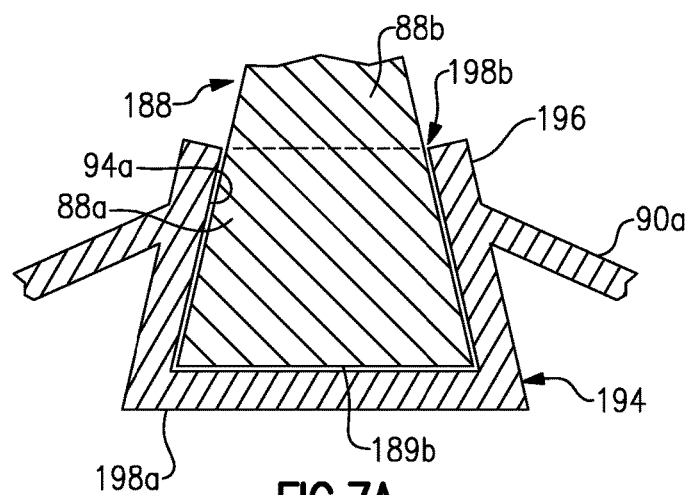
FIG. 7A shows a cross-section of a damper member and a modified guide member having a cup structure.
Figure 7B:
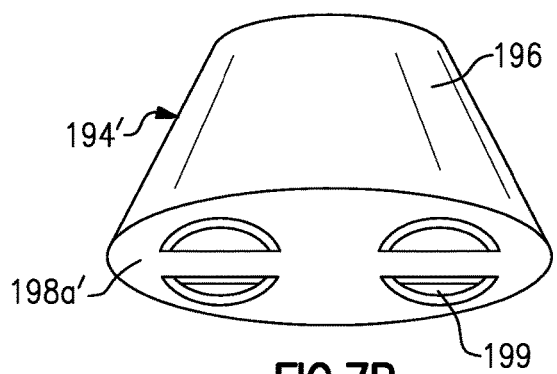
FIG. 7B shows a cross-section of another modified guide member having a cup structure.

As shown in FIG. 3, the damper member 88 spans lengthwise throughout most of the longitudinal length of the cavity 78. However, in other examples, the damper member 88 can be shorter or longer than shown. If the damper member 88 is shorter than shown, the bottom-most guide member 90a may be modified as shown in FIG. 7A or 7B. In this example, the guide piece 194/194' is a cup having sidewalls 196, a bottom wall 198a/198a' that joins the sidewalls 196, and an open top 198b through which the damper member 188 extends. That is, the second terminal end 189b of the damper member 188 is received into the guide piece 194/194' and sits on the bottom wall 198a/198a' when the airfoil 60 is in a static state. In the example of FIG. 7A, the bottom wall 198a is solid. In the example of FIG. 7B, the bottom wall 198a' has openings 199 to reduce weight and/or to permit powder removal in the additive manufacturing process described below. Thus, the cup-like structure can support the damper member 188 at any longitudinal position within the cavity 78.

Figure 8:
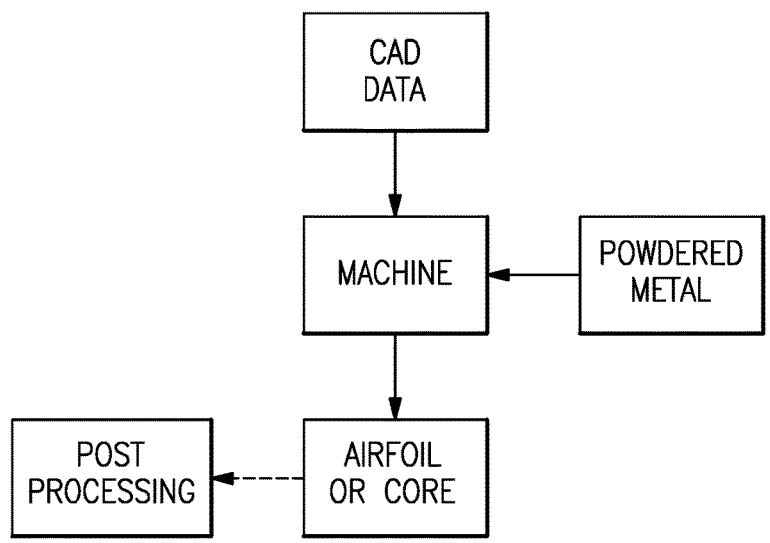
FIG. 8 shows an example method for processing an airfoil.

The geometries disclosed herein may be difficult to form using conventional casting technologies. Thus, a method of processing an airfoil having the features disclosed herein includes an additive manufacturing process, as schematically illustrated in FIG. 8. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
    an airfoil body including a leading edge and a trailing edge and a first sidewall and a second sidewall that is spaced apart from the first sidewall, the first sidewall and the second sidewall joining the leading edge and the trailing edge between a radially outer end and a radially inner end, and a cavity extending radially in the airfoil body; and
    a damper member having a free radially inner end in the cavity and a free radially outer end in the cavity, wherein the damper member radially tapers and is free-floating in the cavity, wherein the free radially inner end sits in a cup in the cavity.

2. The airfoil as recited in claim 1, wherein the damper member is elongated in a radial direction between the radially outer end and the radially inner end.

3. The airfoil as recited in claim 1, wherein the airfoil body further includes at least one fixed guide member that has a bearing surface that circumscribes the damper member.

4. The airfoil as recited in claim 1, wherein the airfoil body further includes at least one guide member that has a sloped bearing surface with regard to a radial direction between the radially outer end and the radially inner end.

5. The airfoil as recited in claim 1, wherein the airfoil body further includes a support arm fixed to at least one of the first sidewall or the second sidewall and a radially elongated guide member supported on the support arm, wherein the radially elongated guide member includes a bearing surface with respect to the damper member.

6. The airfoil as recited in claim 1, wherein the airfoil body includes a plurality of guide members with respective bearing surfaces that are radially spaced apart with regard to a radial direction between the radially outer end and the radially inner end.

7. The airfoil as recited in claim 1, wherein the damper member includes radially alternating bearing sections and non-bearing sections with regard to a radial direction between the radially outer end and the radially inner end.

8. The airfoil as recited in claim 1, wherein the damper member is conical.

9. The airfoil as recited in claim 1, wherein the damper member tapers from the free radially inner end to the free radially outer end.

10. A turbine engine comprising:
    at least one of a fan, a compressor section, or a turbine section that includes a plurality of airfoils, each of the airfoils comprising, an airfoil body including a leading edge and a trailing edge and a first sidewall and a second sidewall that is spaced apart from the first sidewall, the first sidewall and the second sidewall joining the leading edge and the trailing edge between a radially outer end and a radially inner end, and a cavity extending radially in the airfoil body, and a damper member having a free radially inner end in the cavity and a free radially outer end in the cavity, wherein the damper member radially tapers and is free-floating in the cavity, wherein the free radially inner end sits in a cup in the cavity.

11. The turbine engine as recited in claim 10, wherein the damper member is elongated in a radial direction between the radially outer end and the radially inner end.

12. The turbine engine as recited in claim 10, wherein the airfoil body further includes at least one fixed guide member that has a bearing surface that circumscribes the damper member.

13. The turbine engine as recited in claim 10, wherein the airfoil body further includes at least one guide member that has a sloped bearing surface with regard to a radial direction between the radially outer end and the radially inner end.

14. The turbine engine as recited in claim 10, wherein the airfoil body further includes a support arm fixed to at least one of the first sidewall or the second sidewall and a radially elongated guide member supported on the support arm, wherein the radially elongated guide member includes a bearing surface with respect to the damper member.

15. The turbine engine as recited in claim 10, wherein the airfoil body includes a plurality of guide members with respective bearing surfaces that are radially spaced apart with regard to a radial direction between the radially outer end and the radially inner end.

16. The turbine engine as recited in claim 10, wherein the damper member includes radially alternating bearing sections and non-bearing sections with regard to a radial direction between the radially outer end and the radially inner end.

17. An airfoil comprising:
    an airfoil body having an inner end and an outer end defining a radial direction there between, the airfoil body including a radially elongated internal cavity;
    a radially elongated damper member having a free radially outer damper end in the cavity and a free radially inner damper end in the cavity; and
    a guide member in the cavity, the guide member including a continuous bearing surface that is situated with respect to the damper member such that the bearing surface limits movement of the damper member in the radial direction and in a cross direction that is transverse to the radial direction, wherein the free radially inner end sits in a cup in the cavity.

18. The airfoil as recited in claim 17, wherein the continuous bearing surface circumscribes the damper member.

19. The airfoil as recited in claim 17, wherein the continuous bearing surface has a geometry of a frustum.

20. The airfoil as recited in claim 17, wherein the radial direction is a radial outward direction, and the continuous bearing surface is non-limiting with respect to movement of the damper member in a radial inward direction.

21. The airfoil as recited in claim 17, wherein the radially elongated damper member radially tapers from the free radially inner damper end to the free radially outer damper end.

* * * * *